US012603511B2

(12) United States Patent
Liu

(10) Patent No.: US 12,603,511 B2
(45) Date of Patent: *Apr. 14, 2026

(54) CHARGER, DATA CABLE AND CHARGING DEVICE

(71) Applicant: VIVO MOBILE COMMUNICATION CO., LTD., Guangdong (CN)

(72) Inventor: Lin Liu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 661 days.

This patent is subject to a terminal disclaimer.

(21) Appl. No.: 18/096,443

(22) Filed: Jan. 12, 2023

(65) Prior Publication Data

US 2023/0170709 A1     Jun. 1, 2023

Related U.S. Application Data

(63) Continuation of application No. PCT/CN2021/106212, filed on Jul. 14, 2021.

(30) Foreign Application Priority Data

Jul. 14, 2020     (CN) .......................... 202010673785.4

(51) Int. Cl.
 *H02J 7/00*          (2026.01)
 *H01R 13/66*          (2006.01)
                (Continued)

(52) U.S. Cl.
 CPC ............ *H02J 7/47* (2026.01); *H01R 13/6691* (2013.01); *H02J 1/084* (2020.01); *H02J 2207/30* (2020.01)

(58) Field of Classification Search
 USPC ......................................................... 320/137
 See application file for complete search history.

(56) References Cited

U.S. PATENT DOCUMENTS

2015/0349561 A1* 12/2015 Berggren ................ G06F 1/266
                                                              320/162
2016/0283423 A1      9/2016 Srivastava et al.
                (Continued)

FOREIGN PATENT DOCUMENTS

CN          102231543  A      11/2011
CN          105872900  A      8/2016
                (Continued)

OTHER PUBLICATIONS

CN204190458 (Machine Translations) (Year: 2014).*
                (Continued)

*Primary Examiner* — Samuel Berhanu
(74) *Attorney, Agent, or Firm* — BROOKS KUSHMAN P.C.

(57) ABSTRACT

A charger, a data cable, and a charging device. The charger includes a first Type-A port, a PD charging processing unit, a non-PD charging processing unit, a data cable matching unit, and a first switching unit; where the first Type-A port includes a first communication pin and a second communication pin, and in a case that the charger is connected to a first data cable, the first switching unit connects the first communication pin to the PD charging processing unit and the second communication pin to the data cable matching unit to transmit a PD charging signal through the first communication pin, where the data cable matching unit determines, based on a communication signal transmitted through the second communication pin, whether the data cable is a first data cable.

20 Claims, 6 Drawing Sheets

(51) Int. Cl.
    *H02J 1/08*         (2006.01)
    *H02J 7/47*         (2026.01)

(56)               References Cited

U.S. PATENT DOCUMENTS

| | | | |
|---|---|---|---|
| 2018/0054074 A1* | 2/2018 | Guo | .......................... H02J 7/00 |
| 2020/0099238 A1* | 3/2020 | Wu | ...................... H02J 7/0045 |
| 2020/0226087 A1 | 7/2020 | Sun | |

FOREIGN PATENT DOCUMENTS

| | | | |
|---|---|---|---|
| CN | 107181145 A | 9/2017 |
| CN | 107408091 A | 11/2017 |
| CN | 108233130 A | 6/2018 |
| CN | 108270253 A | 7/2018 |
| CN | 109286770 A | 1/2019 |
| CN | 111817382 A | 10/2020 |
| EP | 3584712 A1 | 12/2019 |

OTHER PUBLICATIONS

First Office Action for Chinese Application No. 202010673785.4, dated Jul. 30, 2021, 7 Pages.
International Search Report and Written Opinion for Application No. PCT/CN2021/106212, dated Sep. 29, 2021, 10 Pages.

* cited by examiner

1

1

CHARGER, DATA CABLE AND CHARGING DEVICE

CROSS-REFERENCE TO RELATED APPLICATIONS

This application is a continuation of PCT International Application No. PCT/CN2021/106212 filed on Jul. 14, 2021, which claims priority to Chinese Patent Application No. 202010673785.4, filed on Jul. 14, 2020, which are incorporated herein by reference in their entireties.

TECHNICAL FIELD

This application pertains to the field of communication technologies, and specifically relates to a charger, a data cable, and a charging device.

BACKGROUND

With development of science and technology, fast charging is being applied more widely.

In the related art, a power delivery (PD) protocol is generally used for fast charging. A charger that supports charging over the PD protocol needs to use a configuration channel (CC) signal cable for communication. Such charger that supports charging over the PD protocol is generally provided with a third-standard (Type-C) port and a Type-C to Type-C data cable. Chargers with a first-standard (Type-A or Standard-A) port use a D+/D− signal cable for communication and do not support charging over the PD protocol. However, currently, the most widely used data cables have a Type-A port, so that the Type-A port on the conventional data cables does not match the Type-C port on the chargers that support charging over the PD protocol.

SUMMARY

According to a first aspect, an embodiment of this application provides a charger, including a first Type-A port, a PD charging processing unit, a non-PD charging processing unit, a data cable matching unit, and a first switching unit.

The first Type-A port includes a first communication pin and a second communication pin, and the first switching unit is connected to the first communication pin, the second communication pin, the data cable matching unit, the PD charging processing unit, and the non-PD charging processing unit.

In a case that the charger is connected to a data cable, if the data cable is a first data cable, the first switching unit connects the first communication pin to the PD charging processing unit, connects the second communication pin to the data cable matching unit, and disconnects both the first communication pin and the second communication pin from the non-PD charging processing unit.

In a case that the charger is connected to a data cable, if the data cable is a second data cable, the first switching unit connects both the first communication pin and the second communication pin to the non-PD charging processing unit, and disconnects both the first communication pin and the second communication pin from the PD charging processing unit and the data cable matching unit.

In a case that the data cable matching unit determines, based on a communication signal transmitted through the second communication pin, that the data cable matches the charger, the data cable is the first data cable; or in a case that the data cable matching unit determines, based on the communication signal transmitted through the second communication pin, that the data cable does not match the charger, the data cable is the second data cable.

According to a second aspect, an embodiment of this application provides a data cable, including a second Type-A port, a Type-C port, and a cable connecting the second Type-A port and the Type-C port, and the data cable is provided with a charger matching unit and a second switching unit.

The second Type-A port and the Type-C port each includes a third communication pin and a fourth communication pin, and the Type-C port further includes a first CC pin.

The second switching unit is connected to the third communication pin and the fourth communication pin of the second Type-A port, the third communication pin and the fourth communication pin of the Type-C port, and the charger matching unit.

In a case that the data cable connects a charger to a to-be-charged device, if the charger is a first charger, the second switching unit connects the third communication pin of the second Type-A port to the first CC pin, connects the fourth communication pin of the second Type-A port to the charger matching unit, and disconnects the third communication pins and the fourth communication pins of the second Type-A port and the Type-C port.

In a case that the data cable connects a charger to a to-be-charged device, if the charger is a second charger, the second switching unit connects the third communication pins and the fourth communication pins of the second Type-A port and the Type-C port in one-to-one correspondence, disconnects the third communication pin of the second Type-A port from the first CC pin, and disconnects the fourth communication pin of the second Type-A port from the charger matching unit.

In a case that the charger matching unit determines, based on a match signal transmitted through the fourth communication pin of the second Type-A port, that the charger matches the data cable, the charger is the first charger; or in a case that the charger matching unit determines, based on the match signal transmitted through the fourth communication pin of the second Type-A port, that the charger does not match the data cable, the charger is the second charger.

According to a third aspect, an embodiment of this application provides a charging device, including a charger and a data cable connected to the charger. The charger is the charger according to the first aspect, and the data cable is the data cable according to the second aspect.

In a case that the charger is connected to the data cable, the first communication pin is connected to the third communication pin, and the second communication pin is connected to the fourth communication pin.

The data cable matching unit is configured to: upon determining that the data cable matches the charger successfully, control the first switching unit to connect the first communication pin to the PD charging processing unit, connect the second communication pin to the data cable matching unit, and disconnect both the first communication pin and the second communication pin from the non-PD charging processing unit; and control the second switching unit to connect the third communication pin of the second Type-A port to the first CC pin, connect the fourth communication pin of the second Type-A port to the charger matching unit, and disconnect the third communication pins and the fourth communication pins of the second Type-A port and the Type-C port.

DETAILED DESCRIPTION

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specific order or sequence. It should be understood that data used in this way is used interchangeably in appropriate circumstances so that the embodiments of this application can be implemented in other orders than the order illustrated or described herein. In addition, in this specification and claims, "and/or" represents at least one of connected objects, and the character "/" generally represents an "or" relationship between the associated objects.

The following describes in detail the charger, data cable, and charging device provided in the embodiments of this application through specific embodiments and application scenarios thereof with reference to the accompanying drawings.

Figure 1:
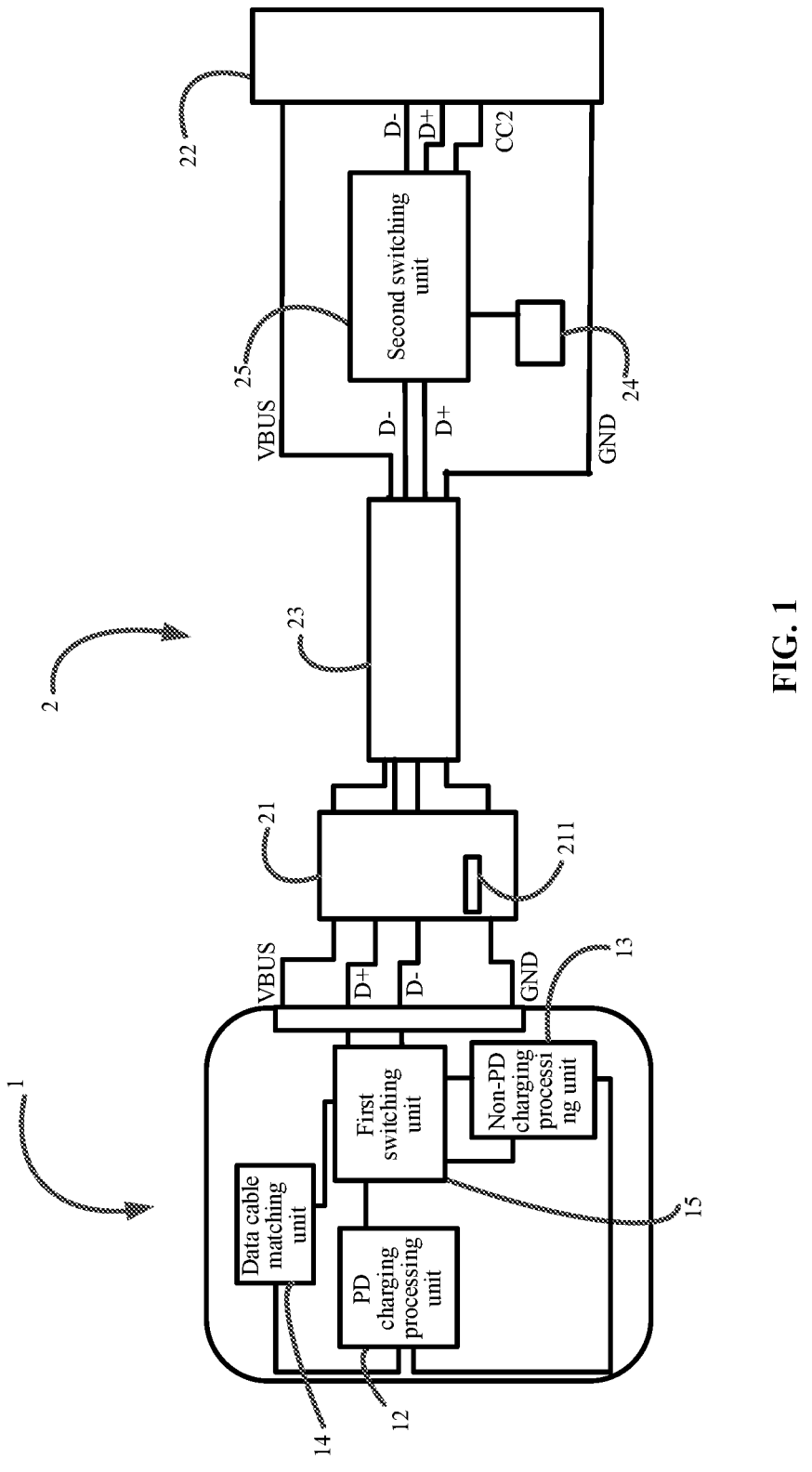
FIG. 1 is a circuit diagram of a charging device according to an embodiment of this application.
Figure 2:
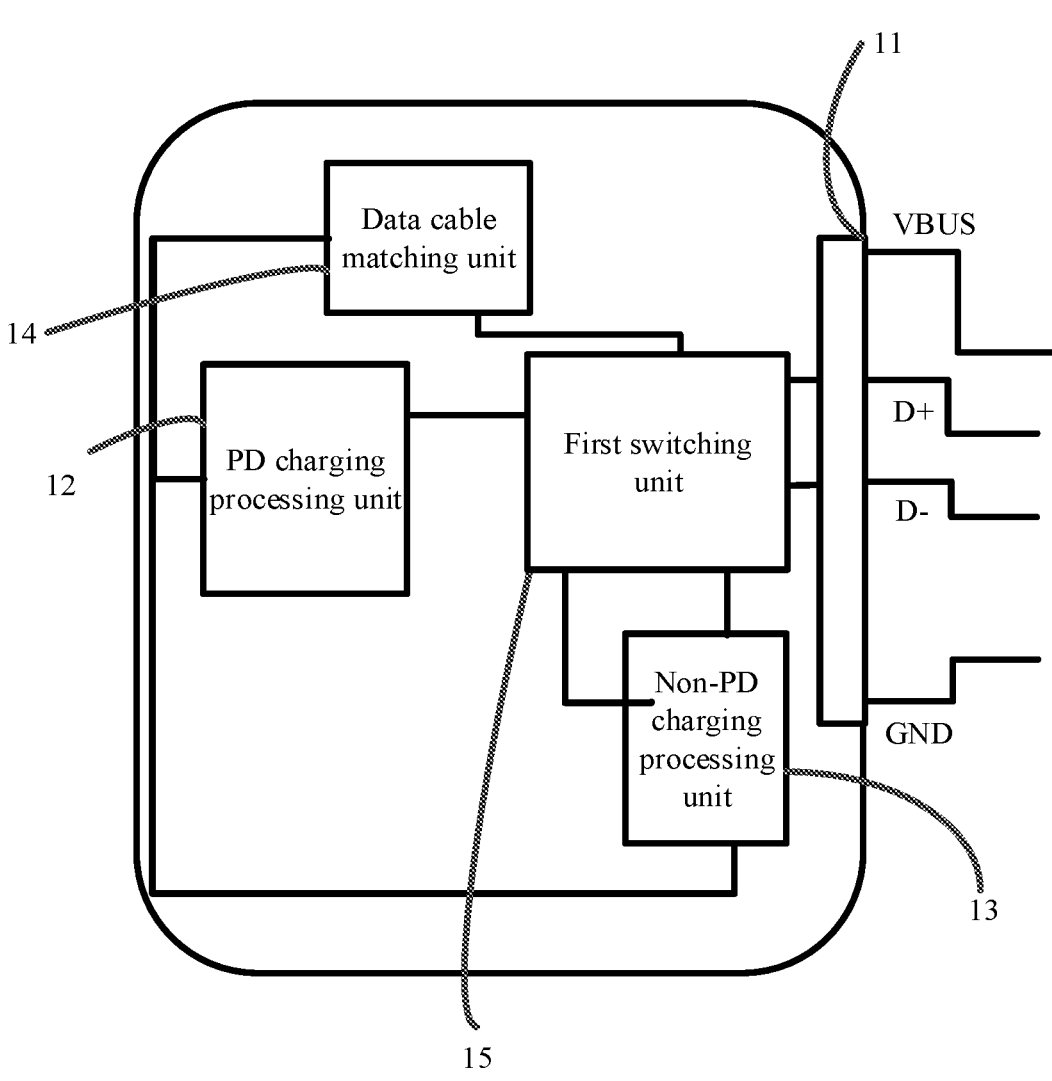
FIG. 2 is a circuit diagram of a charger according to an embodiment of this application.
Figure 3:
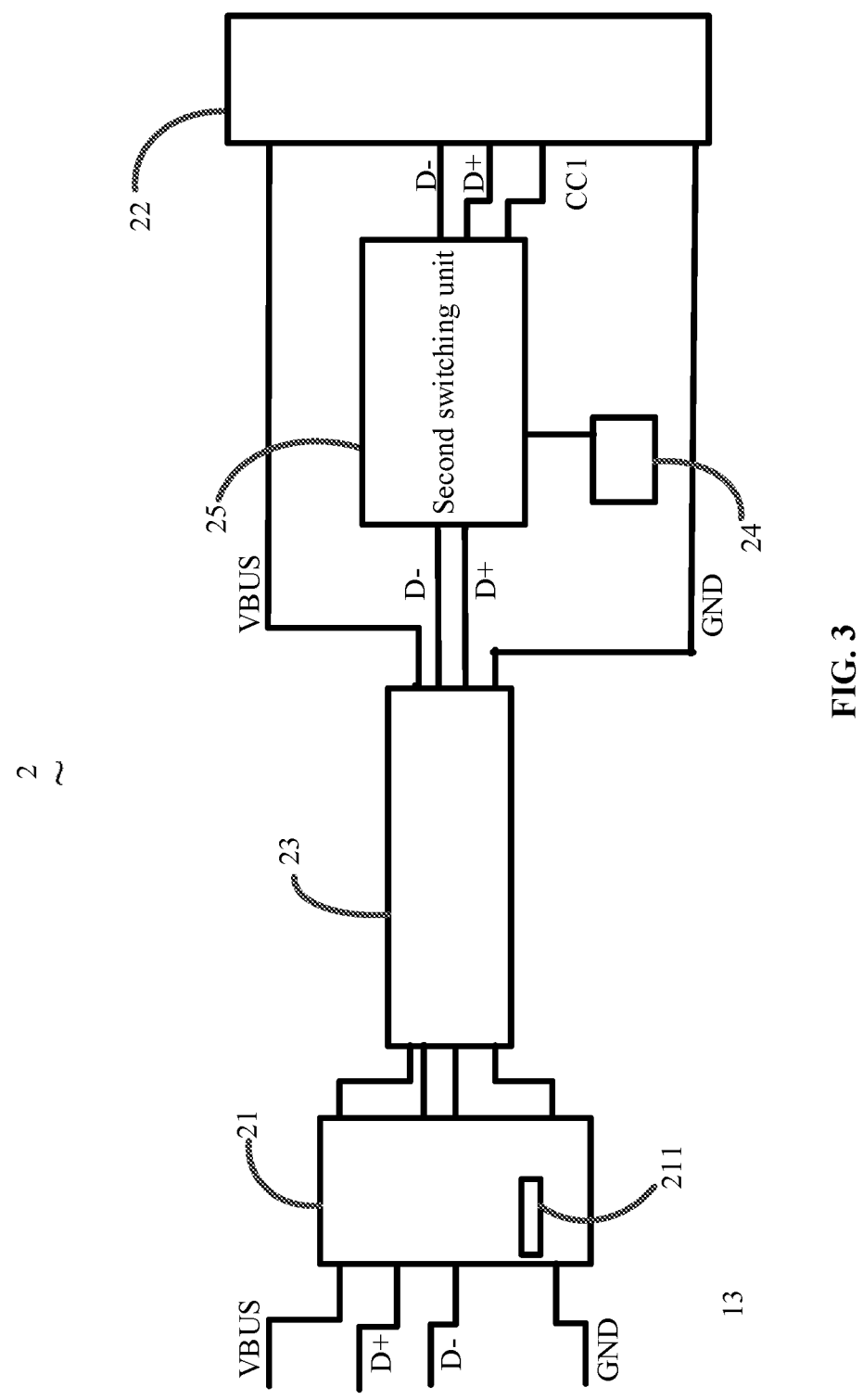
FIG. 3 is a circuit diagram of a data cable according to an embodiment of this application.

Referring to FIG. 1, FIG. 2, and FIG. 3, FIG. 1 is a circuit diagram of a charging device according to an embodiment of this application, FIG. 2 is a circuit diagram of a charger according to an embodiment of this application, and FIG. 3 is a circuit diagram of a data cable according to an embodiment of this application.

A charger 1 provided in an embodiment of this application and a data cable 2 provided in an embodiment of this application match mutually, and they constitute a charging device provided in an embodiment of this application.

Specifically, as shown in FIG. 1, the charger 1 and the data cable 2 are connected through a Type-A port. To be specific, the first communication pin is connected to the third communication pin, and the second communication pin is connected to the fourth communication pin.

In a specific implementation, the foregoing first communication pin and the third communication pin may be pins of a first signal wire, and the second communication pin and the fourth communication pin may be pins of a second signal wire. For example, the foregoing first communication pin and the third communication pin are D+ pins shown in FIG. 1, and the foregoing second communication pin and the fourth communication pin are D− pins shown in FIG. 1. In this case, the foregoing first signal wire may alternatively be referred to as a D+ wire, and the foregoing second signal wire may alternatively be referred to as a D− wire. In a case that the D+ wire and the D− wire are connected, a charging device can perform non-PD charging for a to-be-charged device. The non-PD charging may alternatively be referred to as D+/D− charging. Specifically, charging communication with the to-be-charged device is performed by using the D+ pins and the D− pins. The non-PD charging processing unit 13 supports a communication protocol for a communication signal transmitted through the D+ pins and the D− pins.

The foregoing first communication pin may also be a D− pin, the second communication pin may also be a D+ pin, and alternatively, the foregoing first communication pin and the second communication pin may also be other signal transmission pins, for example, an RX pin and a TX pin of a third-generation universal series bus (USB3.0). This is not specifically limited herein.

For ease of description, the embodiments shown in FIG. 1 to FIG. 4 are described based on an example that the first communication pin is a D+ pin and the second communication pin is a D− pin.

In a case that the charging device is connected to a power supply, mutual matching is performed between the charger 1 and the data cable 2. In addition, in a case that the charger 1 matches the data cable 2, a D+ pin of the charger 1 is connected to a PD charging processing unit 12 and a D+ pin of the data cable 2 is connected to a CC pin, so that a CC signal can be transmitted by multiplexing a D+ pin of a Type-A port. Therefore, the PD charging function is supported.

Specifically, in a case that the charger 1 matches the data cable 2 successfully, the D+ pin is connected to the PD charging processing unit 12, the D− pin is connected to a data cable matching unit 14, the D+ pin and the D− pin are both disconnected from the non-PD charging processing unit 13, a D+ pin of a second Type-A port 21 is connected to a C1 pin, a D− pin of the second Type-A port 21 is connected to a charger matching unit 24, and D+ pins and D− pins of the second Type-A port 21 and a Type-C port 22 are disconnected.

In application, the data cable 2 is provided with a magnetic component 211, and the charger 1 can detect an induced signal strength of the magnetic component 211 by using the data cable matching unit 14. In a case that the induced signal strength is greater than or equal to a preset strength, a process of matching between the data cable 2 and the charger 1 is triggered. During this process of matching, the data cable matching unit 14 and the charger matching unit 24 are connected by using the D− pin. In addition, in a case that it is determined that the data cable 2 matches the charger 1 successfully, the D+ pin of the charger 1 is connected to the PD charging processing unit 12, and the D+ pin of the data cable 2 is connected to the CC1 pin.

It should be noted that: during the process of matching between the charger 1 and the data cable 2, the fourth communication pin may be connected to the charger matching unit 24, and the D− pin is connected to the data cable matching unit 14, so that the charger matching unit 24 and the data cable matching unit 14 are connected and then mutual matching is performed based on a match signal transmitted through the D− pin.

In a specific implementation, the performing mutual matching based on a match signal transmitted by the D− pin may be that the data cable matching unit 14 sends match information to the charger matching unit 24 through the D− pin, where the match information may be a character string prestored in the data cable matching unit 14. When receiving the match information, if the charger matching unit 24 determines that the match information matches the character string prestored in the charger matching unit 24, the charger matching unit 24 can determine that a data cable matches a charger successfully, and feeds back match information to the data cable matching unit 14 to inform the data cable matching unit 14 that the data cable matches the charger successfully.

In a specific implementation, the charger matching unit 24 may transmit a match signal to the data cable matching unit 14, and the data cable matching unit 14 determines whether a data cable matches a charger successfully. This process is similar to the foregoing process of matching in which the data cable matching unit 14 transmits a match signal to the charger matching unit 24. Details are not described herein again.

It should be noted that in a specific implementation, the data cable 2 may not be provided with the magnetic component 211 and the foregoing process of matching between a data cable and a charger is triggered when the data cable is connected to the charger. This is not specifically limited herein.

In addition, in a case that the induced signal strength detected by the data cable matching unit 14 is less than the preset strength, the foregoing process of matching between the data cable 2 and the charger 1 may not be performed. For example, in a case that the charger 1 is connected to a data cable not including the magnetic component 211, a first switching unit 15 disconnects the D− pin from the data cable matching unit 14 and may further connect both the D+ pin and the D− pin to the non-PD charging processing unit 13; and a second switching unit 25 may disconnect the D− pin of the second Type-A port 21 from the charger matching unit 24 and correspondingly connect the D− pins and the D+ pins of the second Type-A port 21 and the Type-C port 22 to transmit a non-PD charging signal through the D− pins and the D+ pins.

In a case that the charging device provided in this embodiment of this application is connected to a first to-be-charged device, the D+ pin is connected to the CC1 pin so that the D+ wire is multiplexed for PD charging for the first to-be-charged device.

In an implementation, the foregoing first to-be-charged device may be a to-be-charged device that supports PD charging, and likewise, a non-first to-be-charged device may be a to-be-charged device that does not support PD charging.

In addition, in a case that the charging device provided in this embodiment of this application is connected to a to-be-charged device that does not support PD charging, communication pins of the charger 1 may alternatively be connected to the non-PD charging processing unit 13, and communication pins of the data cable 2 are connected to corresponding communication pins, so that a non-PD charging signal is transmitted to the to-be-charged device through the communication pins for non-PD charging for the to-be-charged device.

In another implementation, the non-PD charging processing unit 13 and a standard to-be-charged device for the charging device provided in this embodiment of this application may be configured with a preset communication protocol and a universal communication protocol. Communication signals of the preset communication protocol and the universal communication protocol can be transmitted through communication pins (a D+ pin and a D− pin).

In this case, the foregoing first to-be-charged device may be a to-be-charged device that supports PD charging and is not a standard to-be-charged device for the charging device provided in this embodiment of this application. That is, the first to-be-charged device is not configured with the preset communication protocol.

Specifically, in a case that the charging device provided in this embodiment of this application is connected to a non-first to-be-charged device, the D+ pin and the D− pin are both connected to the non-PD charging processing unit 13, and the D+ pins and the D− pins of the second Type-A port 21 and the Type-C port 22 are connected in one-to-one correspondence.

The foregoing non-first to-be-charged device may include the standard to-be-charged device for the charging device provided in this embodiment of this application and a to-be-charged device that is non-standard and does not support PD charging.

Specifically, in a case that the charging device provided in this embodiment of this application is connected to the standard to-be-charged device, the D+ pin and the D− pin are both connected to the non-PD charging processing unit 13, and the D+ pins and the D− pins of the second Type-A port 21 and the Type-C port 22 are connected in one-to-one correspondence.

In this way, a charging signal of the preset communication protocol can be transmitted through communication pins to perform standard charging for the standard to-be-charged device.

In addition, in a case that the charging device provided in this embodiment of this application is connected to a non-standard to-be-charged device that does not support PD charging, the D+ pin and the D− pin are both connected to the non-PD charging processing unit 13, and the D+ pins and the D− pins of the second Type-A port 21 and the Type-C port 22 are connected in one-to-one correspondence.

In this way, a charging signal of the universal communication protocol can be transmitted through the D+ pin and the D− pin to perform conventional charging for the non-standard to-be-charged device. The conventional charging is the same as a charging method in the prior art in which a charging negotiation is performed through D+/D− pins. Details are not described herein again.

Certainly, the charger 1 provided in this embodiment of this application may also be connected to a mismatched data cable to perform non-PD charging for a to-be-charged device. The data cable 2 provided in this embodiment of this application may alternatively be connected to a mismatched charger to transmit a non-PD charging signal through communication pins for non-PD charging of the to-be-charged device.

Refer to FIG. 1 and FIG. 2. The charger 1 includes a first Type-A port 11, the PD charging processing unit 12, the non-PD charging processing unit 13, the data cable matching unit 14, and the first switching unit 15.

Specifically, the first Type-A port 11 includes a D+ pin and a D− pin, and the first switching unit 15 is connected to the D+ pin, the D− pin, the data cable matching unit 14, the PD charging processing unit 12, and the non-PD charging processing unit 13.

In a case that the charger 1 is connected to the data cable 2, if the data cable 2 is a first data cable, the first switching unit 15 connects the D+ pin to the PD charging processing unit 12, connects the D− pin to the data cable matching unit 14, and disconnects both the D+ pin and the D-pin from the non-PD charging processing unit 13.

In a case that the charger 1 is connected to the data cable 2, if the data cable 2 is a second data cable, the first switching unit 15 connects the D+ pin and the D− pin to the non-PD charging processing unit 13, and disconnects the D+ pin and the D− pin from the PD charging processing unit 12 and the data cable matching unit 14.

In a case that an induced signal strength obtained by the data cable matching unit 14 from the magnetic component 211 is greater than or equal to a preset strength and it is determined that the data cable 2 matches the charger 1, the data cable 2 is the first data cable. In a case that the induced signal strength obtained by the data cable matching unit 14 is less than the preset strength and it is determined that the data cable 2 does not match the charger 1, the data cable 2 is the second data cable, and the first data cable includes the magnetic component 211.

Figure 4:
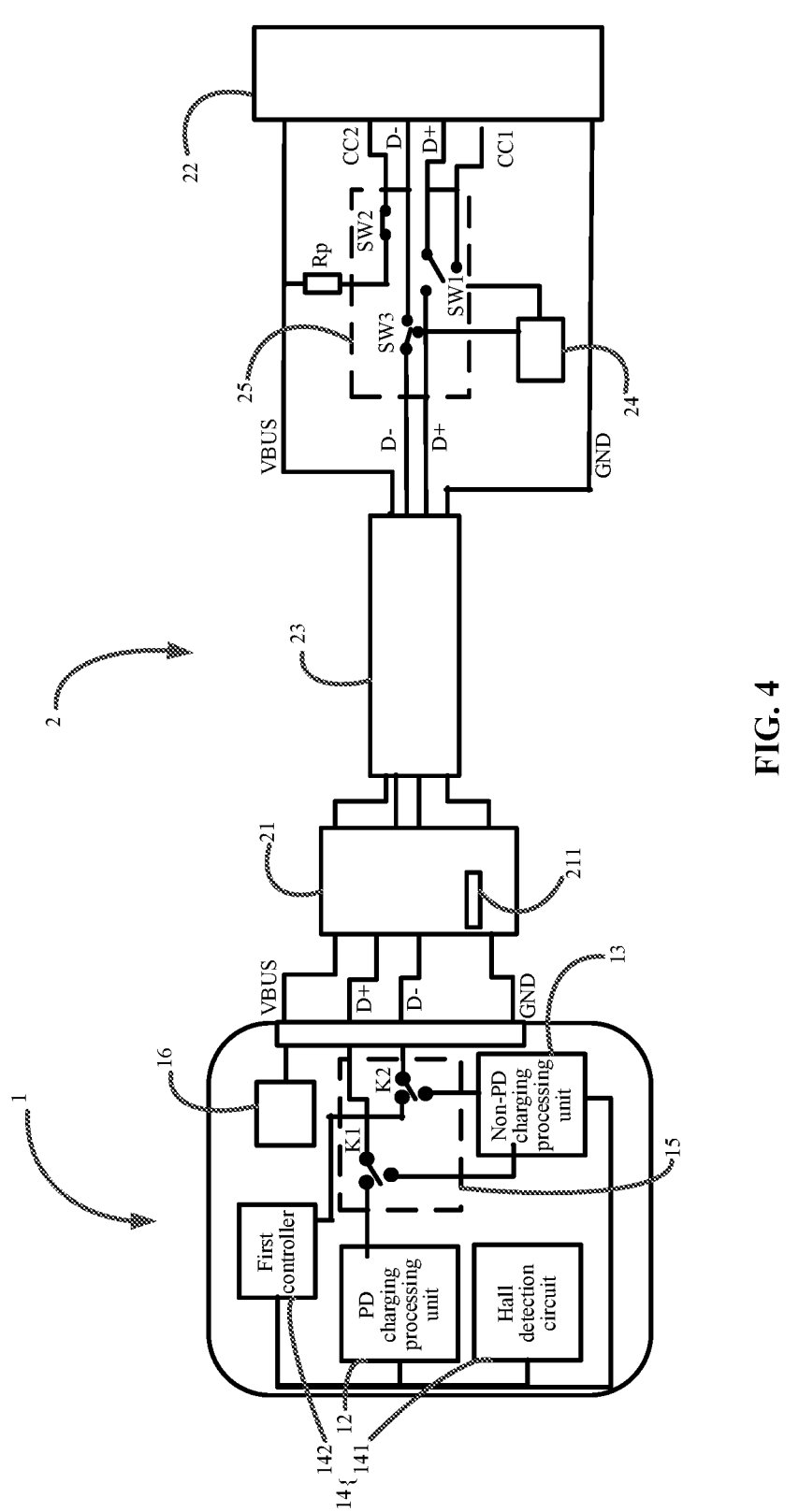
FIG. 4 is a circuit diagram of another charging device according to an embodiment of this application.

In a specific implementation, the foregoing data cable matching unit 14 may include any apparatus that can detect the electromagnetic induced signal strength of the magnetic component 211, for example, a Hall detection unit 141 shown in FIG. 4.

In addition, the foregoing first data cable is the data cable 2 shown in FIG. 1 or FIG. 4, and the first data cable and the charger 1 provided in this embodiment of this application match mutually.

In practical application, the data cable 2 matching the charger 1 provided in this embodiment of this application is provided with the magnetic component 211. The magnetic component 211 may be a magnet, an electromagnet, or the like. The magnetic component 211 may be specifically provided in the second Type-A port 21, through which the data cable 2 is connected to the charger 1. Specifically, the first Type-A port 11 of the charger 1 may be a Type-A female connector, and the second Type-A port 21 of the data cable 2 may be a Type-A male connector.

Therefore, in a case that the Type-A male connector of the data cable 2 is plugged into the Type-A female connector of the charger 1, the magnetic component 211 can extend into a housing of the charger 1, so that the induced signal strength detected by the data cable matching unit 14 is greater than or equal to the preset strength. The preset strength may be preset based on a magnetic strength of the magnetic component 211, a structure of the Type-A port, and the data cable matching unit 14. In this way, if the first Type-A port 11 and the second Type-A port 21 are connected, the induced signal strength detected by the data cable matching unit 14 is greater than or equal to the preset strength; and if the first Type-A port 11 and the second Type-A port 21 are not connected, the induced signal strength detected by the data cable matching unit 14 is less than the preset strength.

In addition, the charger 1 provided in this embodiment of this application supports PD charging and non-PD charging.

PD charging may specifically be that PD charging is performed for a to-be-charged device through a CC pin.

Non-PD charging may specifically be that a charging negotiation is performed for a to-be-charged device through a D+ pin and a D− pin.

In addition, the foregoing first switching unit 15 may be a switch set. The switch set may connect either of the PD charging processing unit 12 and the non-PD charging processing unit 13 to the D+ pin, and the switch set may further connect either of the non-PD charging processing unit 13 and the data cable matching unit 14 to the D− pin.

The data cable matching unit of the charger provided in this embodiment of this application detects an induced signal strength of a magnetic component. In a case that the induced signal strength is greater than or equal to a preset strength and it is determined that the charger is connected to a matching first data cable, the first switching unit connects a D+ pin to the PD charging processing unit, connects a D− pin to the data cable matching unit, and disconnects both the D+ pin and the D− pin from the non-PD charging processing unit, where the first data cable is provided with a magnetic component. In a case that the first data cable is connected to the charger provided in this embodiment of this application, the D+ pin is connected to a CC1 pin, so that a CC signal can be transmitted through the D+ pin. Therefore, the charger can support the PD charging function through a Type-A port.

In an optional implementation, in a case that the charger is connected to a data cable, if the data cable is a first data cable, the first switching unit 15 further connects the data cable matching unit 14 to a D− pin.

In a case that the charger is connected to a data cable, if the data cable is a second data cable, the first switching unit 15 further disconnects the D− pin from the data cable matching unit 14.

The data cable matching unit 14 determines whether the data cable matches the charger based on the obtained induced signal strength and a match signal transmitted by the D− pin.

In a specific implementation, as shown in FIG. 1, a first terminal of the first switching unit 15 is connected to a D+ pin, a second terminal of the first switching unit 15 is connected to a D-pin, a third terminal of the first switching unit 15 is connected to the PD charging processing unit 12, a fourth terminal of the first switching unit 15 is connected to the non-PD charging processing unit 13, and a fifth terminal of the first switching unit 15 is connected to the data cable matching unit 14.

Therefore, in a case that an induced signal strength detected by the data cable matching unit 14 is greater than or equal to a preset strength and the data cable matching unit 14 obtains a match signal from the D− pin, the first switching unit 15 switches on the first terminal and the third terminal and switches on the second terminal and the fifth terminal. In a case that an induced signal strength detected by the data cable matching unit 14 is less than the preset strength or the data cable matching unit 14 does not obtain a match signal from the D− pin, the first switching unit 15 switches on the first terminal and the fourth terminal and switches on the second terminal and the fourth terminal.

In this implementation, in a case that the induced signal strength detected by the data cable matching unit 14 is greater than or equal to the preset strength, the data cable matching unit 14 is triggered to determine, based on the match signal transmitted through the D− pin, whether the data cable 2 is a data cable that matches the charger 1. This prevents the data cable matching unit 14 from falsely determining that the data cable 2 matches the charger 1 in a case that a magnetic component outside the charging device interferes with the induced signal strength detected by the data cable matching unit 14, improving reliability of the process of matching between the charger 1 and the data cable 2.

In an optional implementation, as shown in FIG. 4, the first switching unit 15 includes a first switch K1 and a second switch K2.

The first switch K1 is connected to the D+ pin, the PD charging processing unit 12, and the non-PD charging processing unit 13.

The second switch K2 is connected to the D− pin, the non-PD charging processing unit 13, and the data cable matching unit 14.

In a case that the charger 1 is connected to the first data cable, the first switch K1 connects the first communication pin to the PD charging processing unit 12, and the D+ pin is disconnected from the non-PD charging processing unit 13; and the second switch K2 connects the D− pin to the data cable matching unit 14, and the D– pin is disconnected from the non-PD charging processing unit 13.

In a specific implementation, the first switch K1 and the second switch K2 may be single pole double throw switches, a fixed terminal of the first switch K1 is connected to the D+ pin, and an active terminal of the first switch K1 may be connected to either of the PD charging processing unit 12 and the non-PD charging processing unit 13.

Likewise, a fixed terminal of the second switch K2 is connected to the D– pin, and an active terminal of the second switch K2 may be connected to either of the data cable matching unit 14 and the non-PD charging processing unit 13.

In addition, in practical application, control terminals of the first switch K1 and the second switch K2 are connected to the data cable matching unit 14, so that the ON/OFF state can be switched under control of the data cable matching unit 14.

In this implementation, the first switching unit 15 is set to be the first switch K1 and the second switch K2, which simplifies a structure and control logic of the first switching unit 15.

It should be noted that, in a specific implementation, the foregoing first switch K1 and the second switch K2 may alternatively be analog signal control switches, and the data cable matching unit 14 or another controller in the charger 1 is configured to transmit an analog signal to the control terminals of the first switch K1 and the second switch K2 to adjust the ON/OFF state of the first switch K1 and the second switch K2. This is not specifically limited herein.

In an optional implementation, as shown in FIG. 4, the data cable matching unit 14 includes the Hall detection circuit 141 and a first controller 142 connected to the Hall detection unit 141. The first controller 142 is connected to the control terminal of the first switch K1 and the control terminal of the second switch K2, and the first controller 142 is connected to a third terminal of the second switch K2.

In a case that the charger 1 is connected to the data cable 2, if the induced signal strength detected by the Hall detection circuit 141 is greater than or equal to the preset strength, the first controller 142 controls the second switch K2 to connect the D– pin to the data cable matching unit 14 and the D– pin is disconnected from the non-PD charging processing unit 13, the first controller 142 transmits a first match signal to the data cable through the D– pin, and the first controller 142 determines, upon receiving a second match signal through the D– pin, that the data cable 2 is the first data cable, where the second match signal is a response signal for the first match signal from the first data cable.

In a specific implementation, the foregoing first match signal and the second match signal may be match signals that are the same or correspond to each other, and specifically, may be encoded information with the same regularity, or be the same character string, or the like. The foregoing first controller 142 is prestored with the first match signal and the second match signal or prestored with a corresponding relationship between the first match signal and the second match signal.

In this implementation, the induced signal strength detected by the Hall detection circuit 141 is a magnetic field strength of the magnetic component. In a case that the magnetic field strength is greater than or equal to the preset strength, the second switch K2 is triggered to connect the D– pin to the data cable matching unit 14, and the first controller 142 is triggered to perform matching with the data cable 2 based on the match signal transmitted through the D– pin.

Double matching of electromagnetic induction detection and match signals improves reliability of the matching process.

Refer to FIG. 1 and FIG. 3. The data cable 2 includes the second Type-A port 21, the Type-C port 22, and a cable 23 connecting the second Type-A port 21 and the Type-C port 22. The data cable 2 is provided with the charger matching unit 24 and the second switching unit 25.

The second Type-A port 21 and the Type-C port 22 each includes a third communication pin and a fourth communication pin, the second Type-A port 21 further includes the magnetic component 211, and the Type-C port 22 further includes a CC1 pin.

The second switching unit 25 is connected to the D+ pin and the D– pin of the second Type-A port 21, the D+ pin and the D– pin of the Type-C port 22, and the charger matching unit 24.

In a case that data cable 2 connects the charger 1 to a to-be-charged device, if the charger 1 is a first charger, the second switching unit 25 connects the D+ pin of the second Type-A port 21 to the CC1, connects the D– pin of the second Type-A port 21 to the charger matching unit 24, and disconnects the D+ pins and the D– pins of the second Type-A port 21 and the Type-C port 22.

In a case that data cable 2 connects the charger 1 to a to-be-charged device, if the charger 1 is a second charger, the second switching unit 25 connects the D+ pins and the D– pins of the second Type-A port 21 and the Type-C port 22 in one-to-one correspondence, disconnects the D+ pin of the second Type-A port 21 from the CC1 pin, and disconnects the D– pin of the second Type-A port 21 from the charger matching unit 24.

In a case that the charger matching unit 24 determines, based on a match signal transmitted through the D– pin of the second Type-A port 21, that the charger 1 matches the data cable 2, the charger 1 is the first charger; or in a case that the charger matching unit 24 determines, based on the match signal transmitted through the D– pin of the second Type-A port 21, that the charger 1 does not match the data cable 2, the charger 1 is the second charger.

In a specific implementation, the foregoing first charger is the charger 1 shown in FIG. 1 or FIG. 4, and the first charger and the data cable 2 provided in this embodiment of this application match mutually.

The data cable 2 provided in this embodiment of this application and the charger 1 provided in this embodiment of this application match mutually, and a charger matching process executed by the data cable 2 corresponds to the data cable matching process executed by the charger 1. Details are not described herein again.

In addition, before the data cable 2 matches the matching charger 1 successfully, the fourth communication pin of the second Type-A port 21 may be connected to the charger matching unit 24, so that a match signal can be transmitted to the data cable matching unit 14 of the charger 1 through the D– pin for performing the matching process.

In addition, in a case that the data cable 2 matches the matching charger 1 successfully, the D+ pin of the second Type-A port 21 is connected to the CC1 pin, and the PD charging processing unit 12 may be connected to the CC1 pin, so that the PD charging processing unit 12 is connected to a to-be-charged device through the CC1 pin for PD charging.

The data cable 2 provided in this embodiment of this application has same beneficial effects as the charger 1 and the charging device provided in this embodiment of this application. To avoid repetition, details are not described herein again.

In addition, in a specific implementation, in a case that the second Type-A port 21 is connected to the first Type-A port 11, the magnetic component 211 may be provided on a side of the second Type-A port 21 facing the center of the charger 1.

In this implementation, in a case that the second Type-A port 21 is connected to the first Type-A port 11, the magnetic component 211 can extend deeper into the housing of the charger 1 so that a magnetic field strength in the housing of the charger 1 is greater, increasing the magnetic field strength detected by the Hall detection circuit 141 and improving accuracy of the Hall detection circuit 141.

In addition, in a case that the magnetic component 211 is provided on a first side of the second Type-A port 21, pins (including communication pins, a VBUS pin, and a GND pin) of the second Type-A port 21 may be located on a second side of the second Type-A port 21, and the first side and the second side may be opposite sides of the second Type-A port 21.

In this implementation, interference caused by the magnetic component 211 to the pins of the second Type-A port 21 can be reduced.

In an optional implementation, as shown in FIG. 4, the Type-C port 22 further includes a CC2 pin, the data cable 2 is further provided with a first resistor Rp, and the second switching unit 25 is connected to the first resistor Rp and the CC2 pin.

In a case that the data cable 2 is connected to the first charger, the second switching unit 25 disconnects the CC2 pin from the first resistor Rp; or in a case that the data cable 2 is connected to the second charger, the second switching unit 25 connects the CC2 pin to a VBUS wire of the cable through the first resistor Rp.

In a specific implementation, in a case that the data cable 2 matches the connected charger 1 successfully, the charger 1 is the first charger, and the second switching unit 25 is controlled to disconnect the CC2 pin from the first resistor Rp. In this case, the CC2 is in a high-resistance state (which may also be referred to as an OFF state), and the CC1 pin is connected to a third communication pin (a D+ pin).

In addition, in a case that the data cable 2 is connected to a conventional charger, the conventional charger has a conventional Type-A port, where the Type-A port is of a same structure as the Type-A port in the prior art, and the data cable 2 cannot connect the D+ pin to the PD charging processing unit 12 or transmit a match signal to the charger matching unit 24.

Therefore, in a case that the data cable 2 provided in this embodiment of this application is connected to the conventional charger, a D+ wire and a D− wire of the data cable 2 are connected, the CC1 pin is in a high-resistance state (which may also be referred to as an OFF state), and the CC2 pin of the Type-C port 22 is pulled up to the VBUS pin to allow the charging device to charge a to-be-charged device.

In this case, the data cable 2 provided in this embodiment of this application functions the same as a conventional Type-A to Type-C data cable in the prior art, and the charger can negotiate charging parameters with the to-be-charged device only through the D+ pin and the D-pin, that is, only non-PD charging can be performed for the to-be-charged device.

In an optional implementation, the second switching unit 25 includes a third switch SW1, a fourth switch SW3, and a fifth switch SW2.

A first terminal of the third switch SW1 is connected to the D+ pin of the second Type-A port 21, a second terminal of the third switch SW1 is connected to the CC1 pin, and a third terminal of the third switch SW1 is connected to the D+ pin of the Type-C port 22, where the third switch SW1 connects either of the CC1 pin and the D+ pin of the Type-C port 22 to the D+ pin of the second Type-A port 21.

A first terminal of the fourth switch SW3 is connected to the D− pin of the second Type-A port 21, a second terminal of the fourth switch SW3 is connected to the D− pin of the Type-C port 22, and a third terminal of the fourth switch SW3 is connected to the charger matching unit 24, where the fourth switch SW3 connects either of the charger matching unit 24 and the D− pin of the Type-C port 22 to the D− pin of the second Type-A port 21.

A first terminal of the fifth switch SW2 is connected to the first resistor Rp, and a second terminal of the fifth switch SW2 is connected to the CC2 pin.

In a case that the data cable 2 is connected to the first charger, the third switch SW1 connects the CC1 pin to the D+ pin of the second Type-A port 21, the fourth switch SW3 connects the charger matching unit 24 to the D− pin of the second Type-A port 21, and the fifth switch SW2 is OFF.

In a case that the data cable 2 is connected to the second charger, the third switch SW1 connects the D+ pins of the Type-C port 22 and the second Type-A port 21, the fourth switch SW3 connects the D− pins of the Type-C port 22 and the second Type-A port 21, and the fifth switch SW2 is ON.

In a specific implementation, the third switch SW1, the fourth switch SW3, and the fifth switch SW2 may be digital signal controlled switches. In this case, the charger matching unit 24 transmits a digital control signal to the third switch SW1, the fourth switch SW3, and the fifth switch SW2 to adjust the ON/OFF state of each switch.

Specifically, the third switch SW1 and the fourth switch SW3 may be single pole double throw switches. A fixed terminal of the third switch SW1 is connected to the D+ pin of the second Type-A port 21, and two active terminals of the third switch SW1 are connected to the CC1 pin and the D+ pin of the Type-C port 22 respectively. A fixed terminal of the fourth switch SW3 is connected to the D− pin of the second Type-A port 21, two active terminals of the fourth switch SW3 are connected to the charger matching unit 24 and the D− pin of the Type-C port 22 respectively. The fifth switch SW2 may be a single pole double throw switch.

Certainly, the third switch SW1, the fourth switch SW3, and the fifth switch SW2 may be digital signal controlled switches (for example, a transistor or a MOS tube). In this case, the charger matching unit 24 transmits an electric signal to the third switch SW1, the fourth switch SW3, and the fifth switch SW2 to adjust the ON/OFF state of each switch.

In this implementation, the second switching unit 25 is set to be the third switch SW1, the fourth switch SW3, and the fifth switch SW2, which simplifies a structure and control logic of the second switching unit 25.

In an optional implementation, the charger matching unit 24 includes a second controller. The second controller is connected to a control terminal of the third switch SW1, a control terminal of the fourth switch SW3, and a control terminal of the fifth switch SW2, and the second controller is connected to a third terminal of the fourth switch SW3.

In a case that the data cable 2 is connected to the charger 1, the second controller is configured to determine, when obtaining a first match signal through the D− pin of the second Type-A port 21, that the charger 1 is the first charger, and the second controller is further configured to send, in response to the first match signal, a second match signal to the first charger through the D-pin of the second Type-A port 21.

In a specific implementation, the second controller may be a microcontroller unit (MCU). This is not specifically limited herein.

In this implementation, the second controller is prestored with the first match signal and the second match signal or prestored with a corresponding relationship between the first match signal and the second match signal, so as to determine, upon receiving the first match signal, that the data cable 2 is connected to the matching first charger and transmit the second match signal to the first charger through the D– pin of the second Type-A port 21. This simplifies a structure of the charger matching unit 24 and a control logic for charger matching.

Figure 5:
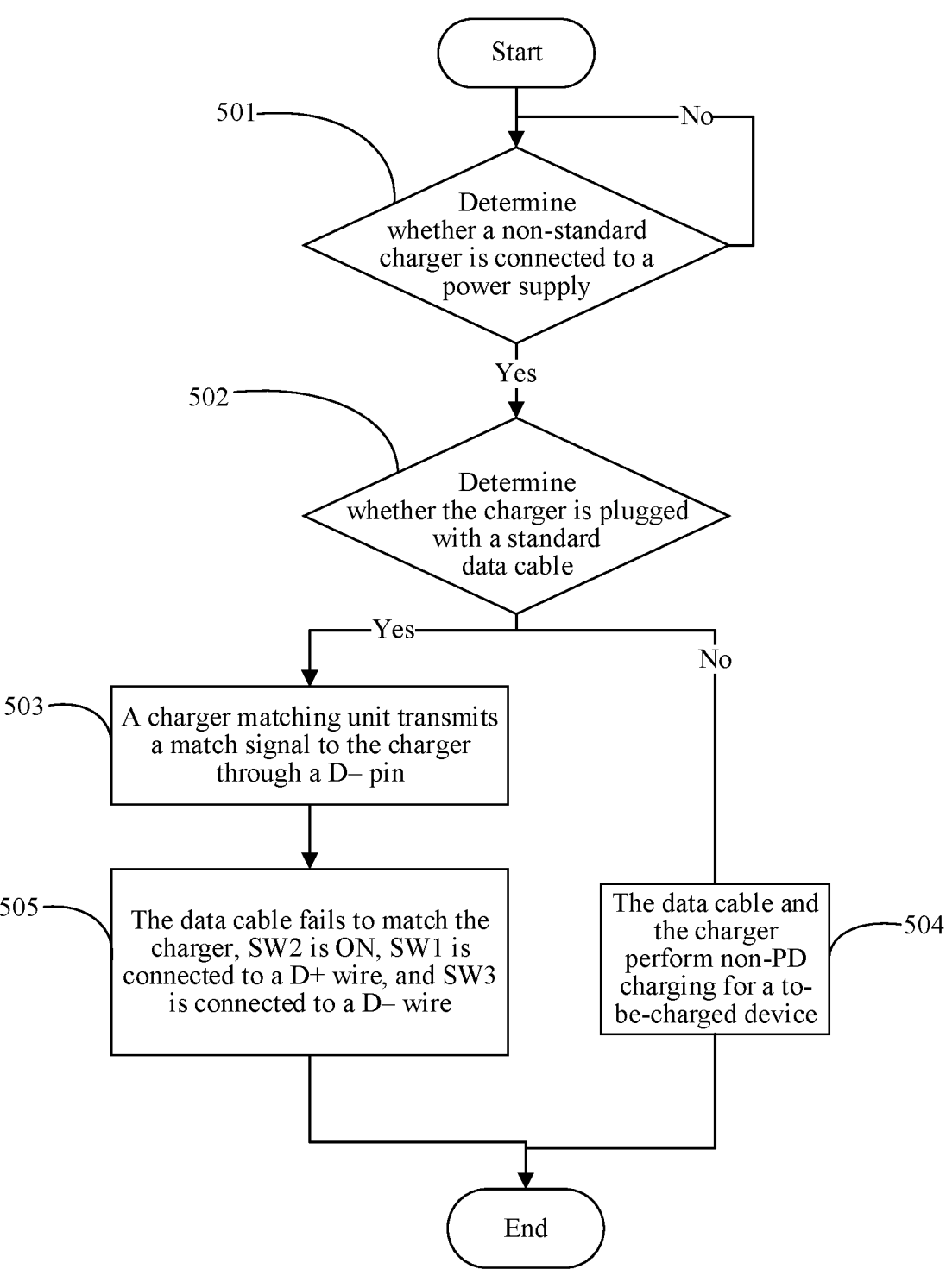
FIG. 5 is a first working flowchart of a charging device according to an embodiment of this application.

It should be noted that the data cable 2 provided in this embodiment of this application may be connected to a conventional charger (that is, a non-standard charger for the data cable 2 provided in this embodiment of this application) for non-PD charging of a to-be-charged device. As shown in FIG. 5, in a case that the data cable 2 is connected to a conventional charger, the detailed workflow is as follows.

Step 501. Determine whether a non-standard charger is connected to a power supply.

In a case that the determining result of this step is "yes", step 502 is performed; otherwise, a subsequent step is performed after the non-standard charger is connected to a power supply.

Step 502. Determine whether the charger is plugged with a standard data cable.

The standard data cable is the data cable 2 provided in this embodiment of this application.

In a case that the determining result of this step is "yes", step 503 is performed; or in a case that the determining result of this step is "no", step 504 is performed. In addition, in a case that the charger is not plugged with a data cable, a subsequent step is performed after the charger is plugged with a data cable.

Step 503. The charger matching unit transmits a match signal to the charger through the D– pin.

It should be noted that, in an initial state in which the standard data cable is not connected to a power supply, the SW2 is ON and the SW3 connects the D– pin to the charger matching unit, so that the charger matching unit can transmit the match signal to the charger through the D– pin when a power supply is connected.

Step 505. The data cable fails to match the charger, the SW2 is ON, the SW1 is connected to a D+ wire, and the SW3 is connected to a D– wire.

In this step, the charger is non-standard and therefore does not feed back, in response to the match signal transmitted by the data cable through the D– pin, a corresponding match signal to the data cable through the D– pin. As a result, matching between the data cable and the charger fails.

In addition, after this step, the data cable and the charger can perform non-PD charging for the to-be-charged device.

Step 504. The data cable and the charger perform non-PD charging for the to-be-charged device.

In a case that the data cable 2 provided in this embodiment of this application is connected to a conventional charger, the D+ wire and the D– wire can be connected by following the foregoing workflow, so that non-PD charging communication with the to-be-charged device can be implemented by using the D+ wire and the D– wire.

Figure 6:
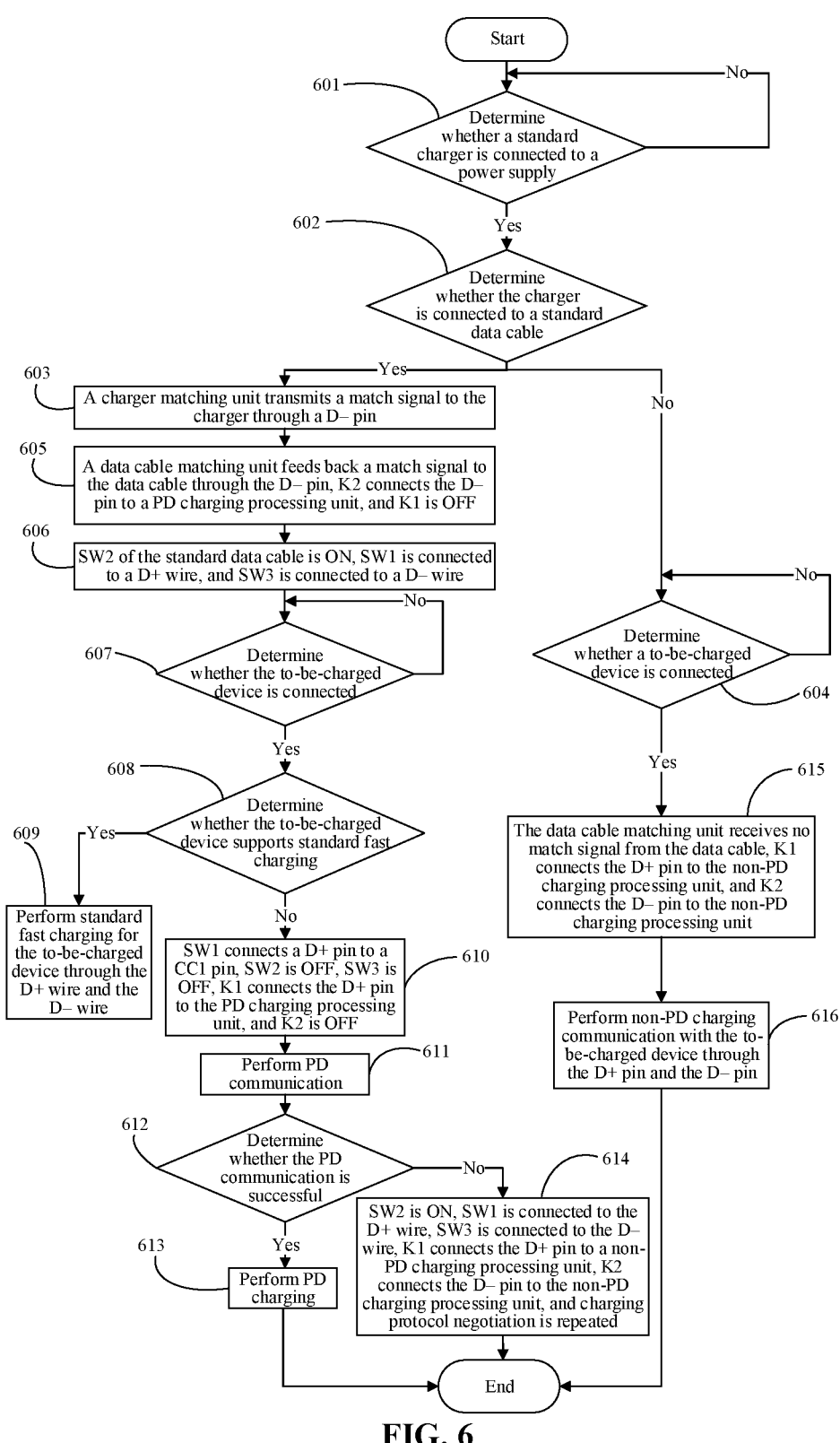
FIG. 6 is a second working flowchart of a charging device according to an embodiment of this application.

It should be noted that the charger 1 provided in this embodiment of this application may alternatively be connected to a conventional data cable for non-PD charging of a to-be-charged device. As shown in FIG. 6, in a case that the charger 1 is connected to a conventional data cable or a standard data cable 2, the detailed workflow is as follows.

Step 601. Determine whether a standard charger is connected to a power supply.

The foregoing standard charger is the charger 1 provided in this embodiment of this application.

In a case that the determining result of this step is "yes", step 602 is performed; otherwise, a subsequent step is performed after the non-standard charger is connected to a power supply.

Step 602. Determine whether the charger is plugged with a standard data cable.

The standard data cable is the data cable 2 provided in this embodiment of this application.

In a case that the determining result of this step is "yes", step 603 is performed; or in a case that the determining result of this step is "no", step 604 is performed. In addition, in a case that the charger is not plugged with a data cable, a subsequent step is performed after the charger is plugged with a data cable.

Step 603. The charger matching unit transmits a match signal to the charger through the D– pin.

It should be noted that, in an initial state in which the standard data cable is not connected to a power supply, the SW2 is ON and the SW3 connects the D– pin to the charger matching unit, so that the charger matching unit can transmit the match signal to the charger through the D– pin when a power supply is connected.

Step 605. The data cable matching unit feeds back a match signal to the data cable through the D– pin, K2 connects the D– pin to the PD charging processing unit, and K1 is OFF.

It should be noted that, in an initial state in which the standard charger is not connected to a power supply, K1 is OFF and K2 connects the D– pin to the data cable matching unit, so that the data cable matching unit can receive the match signal from the data cable through the D– pin when a power supply is connected, feed back a corresponding match signal to the data cable, connect the D– pin to the PD charging processing unit by using K2, and keep K1 OFF.

Step 606. SW2 of the standard data cable is ON, SW1 is connected to the D+ wire, and SW3 is connected to the D– wire.

Step 607. Determine whether a to-be-charged device is connected.

In a case that the determining result of this step is "yes", step 608 is performed; or in a case that the determining result of this step is "no", a subsequent step is performed after a to-be-charged device is connected.

Step 608. Determine whether the to-be-charged device supports standard fast charging.

The foregoing device that supports standard fast charging is a standard to-be-charged device for the charging device provided in this embodiment of this application. The charging device provided in this embodiment of this application and the standard to-be-charged device are preset with a preset charging protocol, and a communication signal over the preset charging protocol is transmitted through the D+ wire and the D– wire.

In a case that the determining result of this step is "yes", step 609 is performed; or in a case that the determining result of this step is "no", step 610 is performed.

Step 609. Perform standard fast charging for the to-be-charged device through the D+ wire and the D– wire.

Step 610. SW1 connects the D+ pin to the CC1 pin, SW2 is OFF, SW3 is OFF, K1 connects the D+ pin to the PD charging processing unit, and K2 is OFF.

SW3 being OFF may be that SW3 disconnects the D–wire or disconnects both the D-wire and the D– pin from the charger matching unit; and K2 being OFF may be that K2 disconnects the D– pin from the non-PD charging processing unit and the data cable matching unit.

Step 611. Perform PD communication.

In this step, PD charging communication is performed between the PD charging processing unit and the to-be-charged device through the D+ wire and the CC1 pin.

Step 612. Determine whether the PD communication is successful.

In a case that the determining result of this step is "yes", step 613 is performed; or in a case that the determining result of this step is "no", step 614 is performed.

Step 613. Perform PD charging.

Step 614. SW2 is ON, SW1 is connected to the D+ wire, SW3 is connected to the D-wire, K1 connects the D+ pin to the non-PD charging processing unit, K2 connects the D–pin to the non-PD charging processing unit, and charging protocol negotiation is repeated.

Step 604. Determine whether the to-be-charged device is connected.

In a case that the determining result of this step is "yes", step 615 is performed; or in a case that the determining result of this step is "no", a subsequent step is performed after a to-be-charged device is connected.

It should be noted that, in an initial state in which the standard charger is not connected to a power supply, K1 is OFF and K2 connects the D– pin to the data cable matching unit, so that the data cable matching unit can receive the match signal from the data cable through the D– pin when a power supply is connected.

Step 615. The data cable matching unit receives no match signal from the data cable, K1 connects the D+ pin to the non-PD charging processing unit, and K2 connects the D– pin to the non-PD charging processing unit.

Step 616. Perform non-PD charging communication with the to-be-charged device through the D+ pin and the D– pin.

After the performing non-PD charging communication with the to-be-charged device through the D+ pin and the D– pin, a corresponding charging mode is used based on a communication result.

It should be noted that, in this specification, the terms "include", "comprise", or any of their variants are intended to cover a non-exclusive inclusion, so that a process, a method, an article, or an apparatus that includes a series of elements not only includes those elements but also includes other elements that are not expressly listed, or further includes elements inherent to such a process, method, article, or apparatus. In absence of more restrictions, an element defined by "including a . . . " does not exclude another same element in the process, method, article, or apparatus that includes the element. In addition, it should be noted that the scopes of the method and electric device in the implementations of this application are not limited to performing functions in the sequence shown or discussed, and may further include performing functions at substantially the same time or in a reverse sequence according to the involved functions. For example, the described method may be performed in a sequence different from the described sequence, and steps may be added, omitted, or combined. In addition, features described with reference to some examples may be combined in other examples.

By means of the foregoing description of the implementations, persons skilled in the art may clearly understand that the method in the foregoing embodiments may be implemented by software with a necessary general hardware platform. Certainly, the method in the foregoing embodiments may also be implemented by hardware. However, in many cases, the former is a preferred implementation. Based on such an understanding, the technical solutions of this application essentially or the part contributing to the prior art may be implemented in a form of a software product. The software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, a person of ordinary skill in the art may develop many other manners without departing from principles of this application and the protection scope of the claims, and all such manners fall within the protection scope of this application.

What is claimed is:

1. A charger, comprising a first Type-A port, a power delivery PD charging processing unit, a non-PD charging processing unit, a data cable matching unit, and a first switching unit; wherein the first Type-A port comprises a first communication pin and a second communication pin, and the first switching unit is connected to the first communication pin, the second communication pin, the data cable matching unit, the PD charging processing unit, and the non-PD charging processing unit; and in a case that the charger is connected to a data cable, if the data cable is a first data cable, the first switching unit connects the first communication pin to the PD charging processing unit, connects the second communication pin to the data cable matching unit, and disconnects both the first communication pin and the second communication pin from the non-PD charging processing unit; or in a case that the charger is connected to a data cable, if the data cable is a second data cable, the first switching unit connects both the first communication pin and the second communication pin to the non-PD charging processing unit, and disconnects both the first communication pin and the second communication pin from the PD charging processing unit and the data cable matching unit; wherein in a case that the data cable matching unit determines, based on a communication signal transmitted through the second communication pin, that the data cable matches the charger, the data cable is the first data cable; or in a case that the data cable matching unit determines, based on the communication signal transmitted through the second communication pin, that the data cable does not match the charger, the data cable is the second data cable.

2. The charger according to claim 1, wherein the first data cable comprises a magnetic component, and the data cable matching unit is able to detect an induced signal strength of the magnetic component; and in a case that an induced signal strength of the magnetic component detected by the data cable matching unit is greater than or equal to a preset strength, the data cable matching unit controls the first switching unit to connect the data cable matching unit to the second communication pin, so that the data cable matching unit performs matching with the data cable based on the communication signal transmitted through the second communication pin; or in a case that an induced signal strength of the magnetic component detected by the data cable matching unit is less than the preset strength, the data cable matching unit controls the first switching unit to disconnect the second communication pin from the data cable matching unit.

3. The charger according to claim 2, wherein the first switching unit comprises a first switch and a second switch;

the first switch is connected to the first communication pin, the PD charging processing unit, and the non-PD charging processing unit; and the second switch is connected to the second communication pin, the non-PD charging processing unit, and the data cable matching unit; wherein in a case that the charger is connected to the first data cable, the first switch connects the first communication pin to the PD charging processing unit, and the first communication pin is disconnected from the PD charging processing unit; and the second switch connects the second communication pin to the data cable matching unit, and the second communication pin is disconnected from the non-PD charging processing unit.

4. The charger according to claim 3, wherein the non-PD charging processing unit supports a communication protocol for a communication signal transmitted through a D+ pin and a D− pin, the first communication pin is one of the D+ pin and the D− pin, and the second communication pin is the other one of the D+ pin and the D− pin.

5. The charger according to claim 3, wherein the data cable matching unit comprises a Hall detection circuit and a first controller connected to the Hall detection circuit, the first controller is connected to a control terminal of the first switch and a control terminal of the second switch, and the first controller is connected to a third terminal of the second switch; wherein in a case that the charger is connected to a data cable, if an induced signal strength detected in the Hall detection circuit is greater than or equal to the preset strength, the first controller controls the second switch to connect the second communication pin to the data cable matching unit, and the second communication pin is disconnected from the non-PD charging processing unit; and the first controller transmits a first match signal to the data cable through the second communication pin, and the first controller determines, upon receiving a second match signal through the second communication pin, that the data cable is the first data cable, wherein the second match signal is a response signal for the first match signal from the first data cable.

6. A data cable, comprising a second Type-A port, a Type-C port, and a cable connecting the second Type-A port and the Type-C port, wherein the data cable is provided with a charger matching unit and a second switching unit;

the second Type-A port and the Type-C port each comprise a third communication pin and a fourth communication pin, and the Type-C port further comprises a first CC pin;

the second switching unit is connected to the third communication pin and the fourth communication pin of the second Type-A port, the third communication pin and the fourth communication pin of the Type-C port, and the charger matching unit; and in a case that the data cable connects a charger to a to-be-charged device, if the charger is a first charger, the second switching unit connects the third communication pin of the second Type-A port to the first CC pin, connects the fourth communication pin of the second Type-A port to the charger matching unit, and disconnects the third communication pins and the fourth communication pins of the second Type-A port and the Type-C port; or in a case that the data cable connects a charger to a to-be-charged device, if the charger is a second charger, the second switching unit connects the third communication pins and the fourth communication pins of the second Type-A port and the Type-C port in one-to-one correspondence, disconnects the third communication pin of the second Type-A port from the first CC pin, and disconnects the fourth communication pin of the second Type-A port from the charger matching unit; wherein in a case that the charger matching unit determines, based on a match signal transmitted through the fourth communication pin of the second Type-A port, that the charger matches the data cable, the charger is the first charger; or in a case that the charger matching unit determines, based on the match signal transmitted through the fourth communication pin of the second Type-A port, that the charger does not match the data cable, the charger is the second charger.

7. The data cable according to claim 6, wherein the Type-C port further comprises a second CC pin, the data cable is further provided with a first resistor, and the second switching unit is connected to the first resistor; wherein in a case that the data cable is connected to the first charger, the second switching unit disconnects the second CC pin from the first resistor; or in a case that the data cable is connected to the second charger, the second switching unit connects the second CC pin to a VBUS wire of the cable through the first resistor.

8. The data cable according to claim 7, wherein the second switching unit comprises a third switch, a fourth switch, and a fifth switch; wherein a first terminal of the third switch is connected to the third communication pin of the second Type-A port, a second terminal of the third switch is connected to the first CC pin, and a third terminal of the third switch is connected to the third communication pin of the Type-C port, wherein the third switch connects either of the first CC pin and the third communication pin of the Type-C port to the third communication pin of the second Type-A port;

a first terminal of the fourth switch is connected to the fourth communication pin of the second Type-A port, a second terminal of the fourth switch is connected to the fourth communication pin of the Type-C port, and a third terminal of the fourth switch is connected to the charger matching unit, wherein the fourth switch connects either of the charger matching unit and the fourth communication pin of the Type-C port to the fourth communication pin of the second Type-A port; and a first terminal of the fifth switch is connected to the first resistor, and a second terminal of the fifth switch is connected to the second CC pin; wherein in a case that the data cable is connected to the first charger, the third switch connects the first CC pin to the third communication pin of the second Type-A port, the fourth switch connects the charger matching unit to the fourth communication pin of the second Type-A port, and the fifth switch is OFF; or in a case that the data cable is connected to the second charger, the third switch connects the third communication pins of the Type-C port and the second Type-A port, the fourth switch connects the fourth communication pins of the Type-C port and the second Type-A port, and the fifth switch is ON.

9. The data cable according to claim 8, wherein the charger matching unit comprises a second controller, the second controller is connected to a control terminal of the third switch, a control terminal of the fourth switch, and a control terminal of the fifth switch, and the second controller is connected to the third terminal of the fourth switch; wherein in a case that the data cable is connected to a charger, the second controller is configured to determine, upon obtaining a first match signal through the fourth communication pin of the second Type-A port, that the charger is the first charger, and the second controller is further configured to send, in response to the first match signal, a second match signal to the first charger through the fourth communication pin of the second Type-A port.

10. The data cable according to claim 6, wherein the second Type-A port and the Type-C port each comprise a D+ pin and a D− pin, the third communication pin is one of the D+ pin and the D− pin, and the fourth communication pin is the other one of the D+ pin and the D− pin; wherein in a case that the data cable is plugged to a charger, the D+ pin is correspondingly connected to a D+ pin of the charger, and the D− pin is correspondingly connected to a D− pin of the charger.

11. The data cable according to claim 6, wherein the second Type-A port is further provided with a magnetic component.

12. A charging device, comprising a charger and a data cable, wherein the charger comprises a first Type-A port, a power delivery PD charging processing unit, a non-PD charging processing unit, a data cable matching unit, and a first switching unit; wherein the first Type-A port comprises a first communication pin and a second communication pin, and the first switching unit is connected to the first communication pin, the second communication pin, the data cable matching unit, the PD charging processing unit, and the non-PD charging processing unit; and in a case that the charger is connected to a data cable, if the data cable is a first data cable, the first switching unit connects the first communication pin to the PD charging processing unit, connects the second communication pin to the data cable matching unit, and disconnects both the first communication pin and the second communication pin from the non-PD charging processing unit; or in a case that the charger is connected to a data cable, if the data cable is a second data cable, the first switching unit connects both the first communication pin and the second communication pin to the non-PD charging processing unit, and disconnects both the first communication pin and the second communication pin from the PD charging processing unit and the data cable matching unit; wherein in a case that the data cable matching unit determines, based on a communication signal transmitted through the second communication pin, that the data cable matches the charger, the data cable is the first data cable; or in a case that the data cable matching unit determines, based on the communication signal transmitted through the second communication pin, that the data cable does not match the charger, the data cable is the second data cable, wherein the data cable comprises a second Type-A port, a Type-C port, and a cable connecting the second Type-A port and the Type-C port, wherein the data cable is provided with a charger matching unit and a second switching unit;

the second Type-A port and the Type-C port each comprise a third communication pin and a fourth communication pin, and the Type-C port further comprises a first CC pin;

the second switching unit is connected to the third communication pin and the fourth communication pin of the second Type-A port, the third communication pin and the fourth communication pin of the Type-C port, and the charger matching unit; and in a case that the data cable connects a charger to a to-be-charged device, if the charger is a first charger, the second switching unit connects the third communication pin of the second Type-A port to the first CC pin, connects the fourth communication pin of the second Type-A port to the charger matching unit, and disconnects the third communication pins and the fourth communication pins of the second Type-A port and the Type-C port; or in a case that the data cable connects a charger to a to-be-charged device, if the charger is a second charger, the second switching unit connects the third communication pins and the fourth communication pins of the second Type-A port and the Type-C port in one-to-one correspondence, disconnects the third communication pin of the second Type-A port from the first CC pin, and disconnects the fourth communication pin of the second Type-A port from the charger matching unit; wherein in a case that the charger matching unit determines, based on a match signal transmitted through the fourth communication pin of the second Type-A port, that the charger matches the data cable, the charger is the first charger; or in a case that the charger matching unit determines, based on the match signal transmitted through the fourth communication pin of the second Type-A port, that the charger does not match the data cable, the charger is the second charger, in a case that the charger is connected to the data cable, the first communication pin is connected to the third communication pin, and the second communication pin is connected to the fourth communication pin; and the data cable matching unit is configured to: upon determining that the data cable matches the charger successfully, control the first switching unit to connect the first communication pin to the PD charging processing unit, connect the second communication pin to the data cable matching unit, and disconnect both the first communication pin and the second communication pin from the non-PD charging processing unit; and control the second switching unit to connect the third communication pin of the second Type-A port to the first CC pin, connect the fourth communication pin of the second Type-A port to the charger matching unit, and disconnect the third communication pins and the fourth communication pins of the second Type-A port and the Type-C port.

13. The charging device according to claim 12, wherein in a case that the data cable is connected to a to-be-charged device, if the to-be-charged device is a non-first to-be-charged device, the first communication pin and the second communication pin are both connected to the non-PD charging processing unit, the first communication pin and the second communication pin are both disconnected from the PD charging processing unit and the data cable matching unit, the third communication pins and the fourth communication pins of the second Type-A port and the Type-C port are connected in one-to-one correspondence, the third communication pin of the Type-A port is disconnected from the first CC pin, and the fourth communication pin of the second Type-A port is disconnected from the charger matching unit; wherein in a case that the charging device determines, based on a communication signal transmitted through the first CC pin, that the charging device does not match the to-be-charged device and the to-be-charged device supports PD charging, the to-be-charged device is the first to-be-charged device.

14. The charging device according to claim 12, wherein the first data cable comprises a magnetic component, and the data cable matching unit is able to detect an induced signal strength of the magnetic component; and in a case that an induced signal strength of the magnetic component detected by the data cable matching unit is greater than or equal to a preset strength, the data cable matching unit controls the first switching unit to connect the data cable matching unit to the second communication pin, so that the data cable matching unit performs matching with the data cable based on the communication signal transmitted through the second communication pin; or in a case that an induced signal strength of the magnetic component detected by the data cable matching unit is less than the preset strength, the data cable matching unit controls the first switching unit to disconnect the second communication pin from the data cable matching unit.

15. The charging device according to claim 14, wherein the first switching unit comprises a first switch and a second switch;

the first switch is connected to the first communication pin, the PD charging processing unit, and the non-PD charging processing unit; and the second switch is connected to the second communication pin, the non-PD charging processing unit, and the data cable matching unit; wherein in a case that the charger is connected to the first data cable, the first switch connects the first communication pin to the PD charging processing unit, and the first communication pin is disconnected from the PD charging processing unit; and the second switch connects the second communication pin to the data cable matching unit, and the second communication pin is disconnected from the non-PD charging processing unit.

16. The charging device according to claim 12, wherein the non-PD charging processing unit supports a communication protocol for a communication signal transmitted through a D+ pin and a D− pin, the first communication pin is one of the D+ pin and the D− pin, and the second communication pin is the other one of the D+ pin and the D− pin.

17. The charging device according to claim 15, wherein the data cable matching unit comprises a Hall detection circuit and a first controller connected to the Hall detection circuit, the first controller is connected to a control terminal of the first switch and a control terminal of the second switch, and the first controller is connected to a third terminal of the second switch; wherein in a case that the charger is connected to a data cable, if an induced signal strength detected in the Hall detection circuit is greater than or equal to the preset strength, the first controller controls the second switch to connect the second communication pin to the data cable matching unit, and the second communication pin is disconnected from the non-PD charging processing unit; and the first controller transmits a first match signal to the data cable through the second communication pin, and the first controller determines, upon receiving a second match signal through the second communication pin, that the data cable is the first data cable, wherein the second match signal is a response signal for the first match signal from the first data cable.

18. The charging device according to claim 12, wherein the Type-C port further comprises a second CC pin, the data cable is further provided with a first resistor, and the second switching unit is connected to the first resistor; wherein in a case that the data cable is connected to the first charger, the second switching unit disconnects the second CC pin from the first resistor; or in a case that the data cable is connected to the second charger, the second switching unit connects the second CC pin to a VBUS wire of the cable through the first resistor.

19. The charging device according to claim 18, wherein the second switching unit comprises a third switch, a fourth switch, and a fifth switch; wherein a first terminal of the third switch is connected to the third communication pin of the second Type-A port, a second terminal of the third switch is connected to the first CC pin, and a third terminal of the third switch is connected to the third communication pin of the Type-C port, wherein the third switch connects either of the first CC pin and the third communication pin of the Type-C port to the third communication pin of the second Type-A port;

a first terminal of the fourth switch is connected to the fourth communication pin of the second Type-A port, a second terminal of the fourth switch is connected to the fourth communication pin of the Type-C port, and a third terminal of the fourth switch is connected to the charger matching unit, wherein the fourth switch connects either of the charger matching unit and the fourth communication pin of the Type-C port to the fourth communication pin of the second Type-A port; and a first terminal of the fifth switch is connected to the first resistor, and a second terminal of the fifth switch is connected to the second CC pin; wherein in a case that the data cable is connected to the first charger, the third switch connects the first CC pin to the third communication pin of the second Type-A port, the fourth switch connects the charger matching unit to the fourth communication pin of the second Type-A port, and the fifth switch is OFF; or in a case that the data cable is connected to the second charger, the third switch connects the third communication pins of the Type-C port and the second Type-A port, the fourth switch connects the fourth communication pins of the Type-C port and the second Type-A port, and the fifth switch is ON.

20. The charging device according to claim 19, wherein the charger matching unit comprises a second controller, the second controller is connected to a control terminal of the third switch, a control terminal of the fourth switch, and a control terminal of the fifth switch, and the second controller is connected to the third terminal of the fourth switch; wherein in a case that the data cable is connected to a charger, the second controller is configured to determine, upon obtaining a first match signal through the fourth communication pin of the second Type-A port, that the charger is the first charger, and the second controller is further configured to send, in response to the first match signal, a second match signal to the first charger through the fourth communication pin of the second Type-A port.

\* \* \* \* \*